(12) United States Patent
Wallman

(10) Patent No.: US 7,386,719 B2
(45) Date of Patent: Jun. 10, 2008

(54) SYSTEM AND METHOD FOR ELIMINATING VIRUSES AT A WEB PAGE SERVER

(75) Inventor: Bruce Wallman, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 10/629,178

(22) Filed: Jul. 29, 2003

(65) Prior Publication Data

US 2005/0027992 A1    Feb. 3, 2005

(51) Int. Cl.
*G06F 9/00* (2006.01)

(52) U.S. Cl. .................. 713/154; 713/188; 726/11; 726/12

(58) Field of Classification Search .......... 726/11, 726/12; 713/154, 187, 188
See application file for complete search history.

(56) References Cited

U.S. PATENT DOCUMENTS

| | | | | |
|---|---|---|---|---|
| 5,175,765 | A * | 12/1992 | Perlman | 380/30 |
| 5,832,208 | A * | 11/1998 | Chen et al. | 726/24 |
| 6,605,120 | B1 * | 8/2003 | Fields et al. | 715/513 |
| 2001/0042200 | A1 | 11/2001 | Lamberton et al. | |
| 2002/0002686 | A1 | 1/2002 | Vange et al. | |
| 2002/0016925 | A1 | 2/2002 | Pennec et al. | |
| 2002/0103783 | A1 | 8/2002 | Muhlestein | |
| 2002/0103916 | A1 | 8/2002 | Chen et al. | |
| 2002/0147915 | A1 | 10/2002 | Chefalas et al. | |
| 2002/0199109 | A1 | 12/2002 | Boom | |
| 2003/0023733 | A1 | 1/2003 | Lingafelt et al. | |
| 2003/0037258 | A1 | 2/2003 | Koren | |
| 2003/0046577 | A1 | 3/2003 | Silverman | |
| 2003/0061306 | A1 | 3/2003 | Kanno et al. | |

OTHER PUBLICATIONS

Wang, R. et al., "Design and Implementation of Acceptance Monitor for Building Scalable Intrusion Tolerant Systems," date and source unknown, pp. 1-21.
"Status 204," author and source unknown, Oct. 1998, pp. 1-4.

* cited by examiner

*Primary Examiner*—Thomas R. Peeso
(74) *Attorney, Agent, or Firm*—Douglas A. Lashmit; Hoffman, Warnick & D'Alessandro LLC

(57) ABSTRACT

A system and method for providing anti-virus protection to a web server. The method comprises the steps of: receiving web pages that are to be stored at the web server; stripping active elements from the web pages being stored at the web server; storing the web pages at the web server; receiving a request for a web page to be served by the web server; determining if active elements are required for the requested web page; inserting active elements into the requested web page if active elements are required; and serving the requested web page.

5 Claims, 2 Drawing Sheets

US 7,386,719 B2

SYSTEM AND METHOD FOR ELIMINATING VIRUSES AT A WEB PAGE SERVER

BACKGROUND OF THE INVENTION

1. Technical Field

The present invention relates generally to anti-virus systems, and more specifically relates to a system and method that avoids storing and forwarding web pages that can carry viruses.

2. Related Art

Viruses are prevalent today throughout the Internet, and can be spread in many different ways. One technique for spreading viruses is to embed a virus in a web page as an active web page element. Then, when a user loads the web page from a web server, the virus can be launched onto the user's computer. Often, a web page server receives and stores web pages from many different sources and/or authors. Accordingly, identifying these types of viruses can be a difficult and time-consuming process for the web server.

One way to address this problem is to run virus-checking programs on the web server to scan for viruses and remove any residual viruses. Unfortunately, virus-checking programs provide several drawbacks including: (1) they consume computational resources; (2) that must be run often to be effective; and (3) they are limited by the effectiveness of the scanning program.

For instance, U.S. patent application US 2002/0103783 A1, by Muhlestein, "Decentralized Virus Scanning For Stored Data," filed on Aug. 1, 2002, which is hereby incorporated by reference, provides a system for scanning requested files for viruses. The invention, however, requires an external computing device that opens requested files and scans for viruses any time there appears to be some risk. Thus, the system potentially consumes a significant amount of time and resources.

Accordingly, a need exists for a web server system that can eliminate viruses without incurring such computational overhead.

SUMMARY OF THE INVENTION

The present invention addresses the above-mentioned problems, as well as others, by providing a system and method for eliminating viruses at a web server by storing pages without any active web page elements. In a first aspect, the invention provides a web server having anti-virus protection, comprising: an active element filter for stripping active elements from web pages being stored at the web server; and an active element insertion system for inserting active elements into stored web pages when the web page is requested.

In a second aspect, the invention comprises a method for providing anti-virus protection to a web server, comprising: receiving web pages that are to be stored at the web server; stripping active elements from the web pages being stored at the web server; storing the web pages at the web server; receiving a request for a web page to be served by the web server; determining if active elements are required for the requested web page; inserting active elements into the requested web page if active elements are required; and serving the requested web page.

In a third aspect, the invention provides a program product stored on recordable medium for providing anti-virus protection to a server, comprising: means for stripping active elements from files being stored at the server; means for determining if active elements are required for a file being requested from the server; and means for inserting an active element into the requested file if an active element is required.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
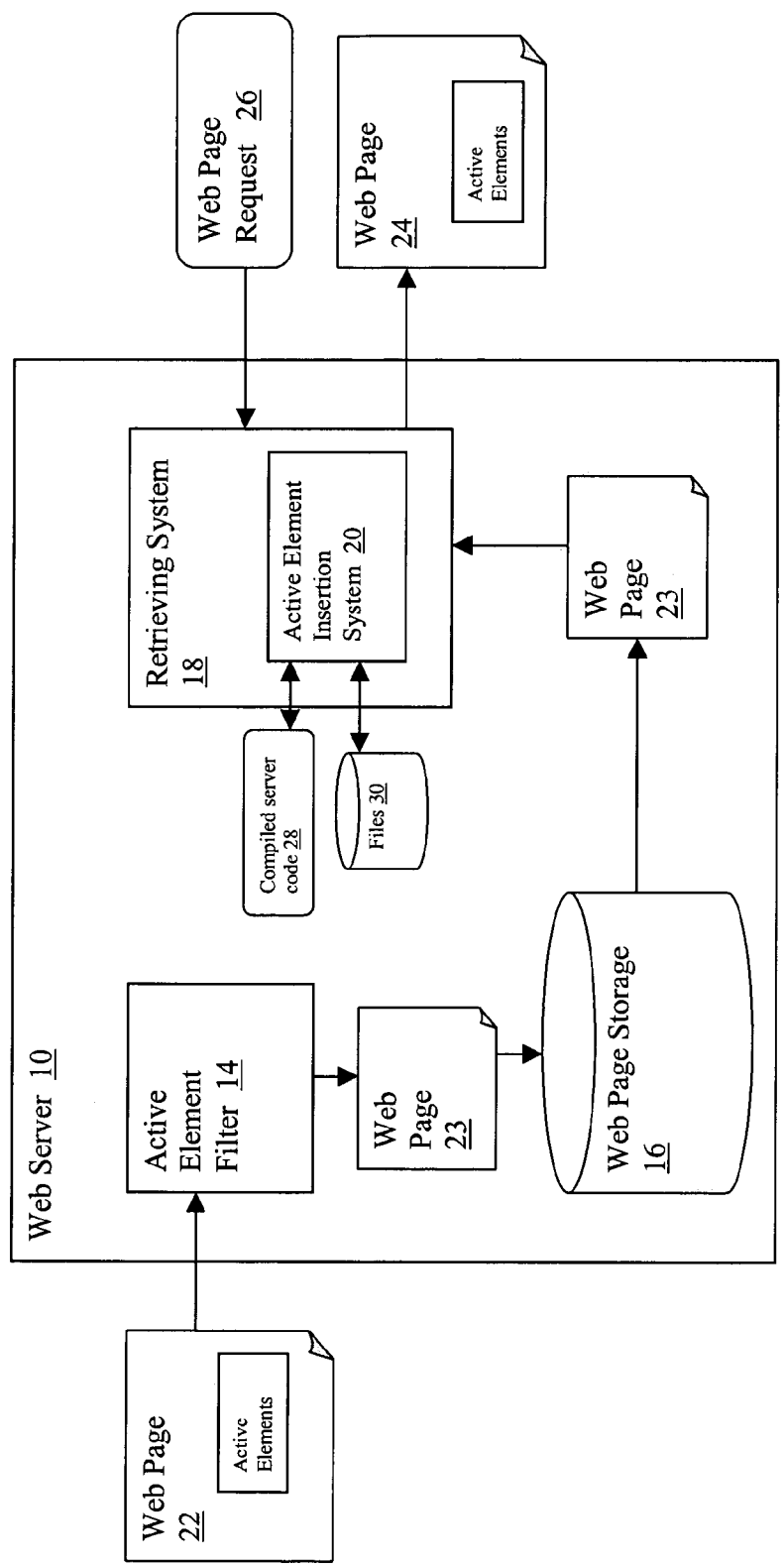
FIG. 1 depicts a web server having an anti-virus system in accordance with the present invention.

Referring now to the drawings, FIG. 1 depicts a web server 10 having a system for eliminating viruses stored in active elements of web pages. In particular, web server 10 includes an active element filter 14 that strips active elements from web pages 22 being stored at the web server 10. By doing this, web server 10 eliminates the dissemination of viruses launched from active elements in a web page 24 being served by web server 10.

An active element may include any type of code fragment that instructs a browser, client, interpreter, virtual machine, processor, etc., to perform some action when the code fragment is encountered. In the exemplary embodiments described herein, active elements are described with reference to JavaScript constructs stored in web pages. However, it should be understood that the invention could apply to any type of active element (e.g., VBScript, Tcl, Perl, Rexx, etc.) stored in any type of servable file. Exemplary uses for JavaScript constructs in a Web environment includes performing actions such as: (1) automatically changing a formatted date on a Web page; (2) causing a linked-to page to appear in a popup window; and (3) causing text or a graphic image to change during a mouse rollover.

The filtering process may strip out active elements from web pages in any manner, e.g., with a software program that identifies and removes JavaScript constructs. In a typical browser application, the number of different types of JavaScript constructs is relatively small, e.g., 6-12. Accordingly, identifying and eliminating the constructs is a relatively trivial task. Once filtered, the stripped web page 23 is stored in web page storage 26. If no active elements exist in a web page 22 that is to be stored, then no filtering is required, and the web page 22 is simply stored in web page storage 16. If active elements exist that are needed when the page is stored, these can be noted by XML or similar replacement elements.

When the web server 10 receives a request 26 for a web page 23, e.g., from a client or other server, retrieving system 18 fetches the web page 23 from web page storage 16. Retrieving system 18 then determines if the web page 23 requires any active elements. This determination can be made by looking for predetermined additions to each page, or by finding stored requests, such as the XML elements noted above, and replacing these elements with programmed active elements known to be 'safe.' If no active elements are required, then the web page is served. If one or more active elements are required, then they are added in by active element insertion system 20.

Active elements can be added to the web page 23 in any manner. In one exemplary embodiment, the active elements could be stored in compiled server code 28. This implementation has the advantage of providing heightened security since no one can construct and leave active files with active elements on the server other than the authors of the server themselves. As an alternative embodiment, the active elements can be stored in files 30 separate from the web page storage 16, and accessed by active element insertion system 20. As noted above, the number of different type of active elements in a browser application is relatively small. Accordingly, implementing the active element insertion system 20 is a fairly simple operation for one skilled in the art.

In order to insert active elements back into web page 23, active element insertion system 20 will typically need to first examine the attributes of web page 23. For example, suppose that it is desired to bring every page of a certain type to a front-most window on the client's computer. A bring-to-front JavaScript element could be added to every page being sent to clients by adding it as an 'onLoad' request at the start of every HTML page using the active element insertion system 20. If this type of element is needed for only certain pages, this could be identified either by something unique to these pages such as something special about their names, or it could be determined by placing XML code such as <newElement>Bring-To-Front</newElement> in the proper pages and then replacing this with 'safe' active code using the active element insertion system 20. Once the active elements are inserted, the web page 24 containing the active elements is served to the requesting entity. Accordingly, it is impossible to infect the web server 10 with a virus stored in an active element of a web page.

Figure 2:
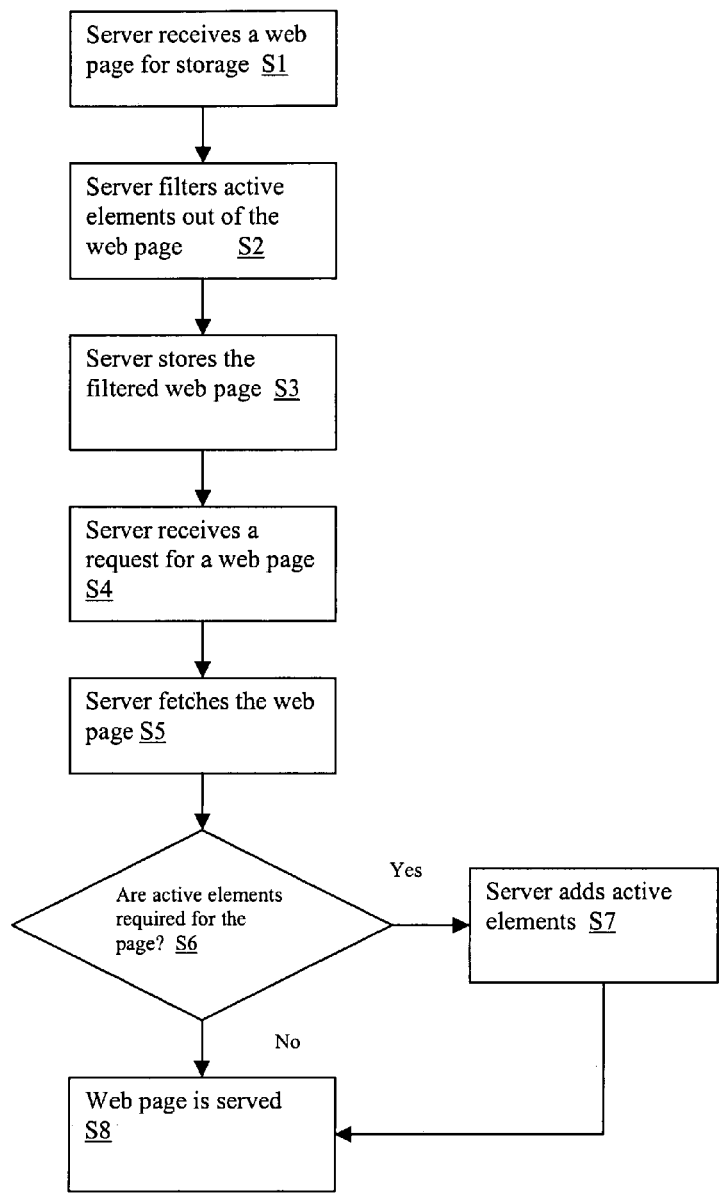
FIG. 2 depicts a flow diagram of a method of implementing the present invention.

Referring now to FIG. 2, a flow diagram of a method of implementing the invention is shown. At step S1, the server receives a web page to be stored. At step S2, the server filters out any active elements from the web page, and stores the web page at step S3. At step S4, the server receives a request for a web page, and fetches the web page from storage at step S5. Next, at step S6, a determination is made whether there are active elements required for the requested page. If no active elements are required, the web page is served at step S8. Otherwise, if active elements are required, then the server adds back the active elements at step S7, and serves the web page with the active elements inserted at step S8.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A method for providing anti-virus protection to a web server, comprising:
   receiving web pages that are to be stored at the web server;
   stripping active elements from the web pages being stored at the web server such that active elements originally embedded in the web pages are deleted;
   storing the web pages at the web server;
   receiving a request for a web page to be served by the web server;
   determining if active elements are required for the requested web page;
   inserting active elements into the requested web page if active elements are required; and
   serving the requested web page.

2. The method of claim 1, wherein the active elements include constructs selected from the group consisting of: JavaScript and VBScript.

3. The method of claim 1, wherein the step of inserting active elements includes the step of executing compiled code having active element constructs and rules for inserting the constructs into a web page.

4. The method of claim 1, wherein the step of inserting active elements includes the step of accessing a file having a required active element.

5. The method of claim 1, wherein the step of inserting active elements includes the step of determining what active elements are required in a requested web page based on attributes of the web page.

* * * * *